US008887075B2

(12) United States Patent
Neil

(10) Patent No.: US 8,887,075 B2
(45) Date of Patent: *Nov. 11, 2014

(54) SYSTEM AND METHOD FOR DEVICE SKINNING

(75) Inventor: Timothy Neil, Mississauga (CA)

(73) Assignee: BlackBerry Limited, Waterloo (CA)

( * ) Notice: Subject to any disclaimer, the term of this patent is extended or adjusted under 35 U.S.C. 154(b) by 1540 days.

This patent is subject to a terminal disclaimer.

(21) Appl. No.: 12/116,419

(22) Filed: May 7, 2008

(65) Prior Publication Data

US 2008/0282227 A1    Nov. 13, 2008

Related U.S. Application Data

(60) Provisional application No. 60/916,404, filed on May 7, 2007.

(51) Int. Cl.
| G06F 15/00 | (2006.01) |
| G06F 13/00 | (2006.01) |
| G06F 9/44  | (2006.01) |

(52) U.S. Cl.
CPC .................................. *G06F 9/4443* (2013.01)
USPC .......................................... 715/764; 715/820

(58) Field of Classification Search
CPC .................................................... G06F 9/4443
USPC ......... 715/764, 851–853, 863, 751–753, 760, 715/780, 741–745
See application file for complete search history.

(56) References Cited

U.S. PATENT DOCUMENTS

| 6,305,008 | B1   | 10/2001 | Vaidyanathan et al. |         |
| 6,314,559 | B1 * | 11/2001 | Sollich .......................... | 717/111 |
| 7,478,367 | B2 * | 1/2009  | Morgan et al. ................ | 717/124 |
| 2002/0184610 | A1 * | 12/2002 | Chong et al. .................. | 717/109 |
| 2006/0090154 | A1   | 4/2006  | Bustelo et al.   |         |
| 2008/0201453 | A1 * | 8/2008  | Assenmacher ............... | 709/219 |
| 2008/0244560 | A1   | 10/2008 | Neagu et al.     |         |

OTHER PUBLICATIONS

Qusay H. Mahmoud: "WAP for Java Developers" Javaworld, [online] Jun. 2, 2000, pp. 1-7, XP 002492046 Retrieved from the Internet: URL:http://www.javaworld.com/jawaworld/jw-06-2000/jw-0602-wap.html>.
W3C: "Content Selection for Device Independence (DISelect) 1.0—W3C Working Draft Oct. 10, 2006" [online] Oct. 10, 2006, pp. 1-16, XP002492047 Retrieved from the Internet URL:http://www.w3.org/TR/2006/WD-cselection-20061010/>.
Landers et al: "Technical Working Paper 2002, Ericsson Eduction (From e-Learning to m-Learning)" [Online] 2002, pp. 1-33, XP002492048 Retrieved from the Internet: URL:http://learning.ericsson.net/mlearning2/project_one/technical_working_paper_erisson.pdf>.
European Search Report dated Aug. 13, 2008 for EP 08 15 5835, by Examiner David Hardeman.
Satria, et all. "VDEES: A Virtual Development Environment for Embedded Software Using Open Source Software", 2009, IEEE, p. 959-966.

(Continued)

*Primary Examiner* — Kevin Nguyen
(74) *Attorney, Agent, or Firm* — Perry + Currier Inc.

(57) ABSTRACT

A plugin for an Integrated Design Environment is provided, including a set of commands for defining an appearance of a UI design window in the Integrated Design Environment. The appearance of the application design window simulates a display screen of a portable electronic device and the set of commands being related to one type of portable electronic device.

18 Claims, 13 Drawing Sheets

(56) References Cited

OTHER PUBLICATIONS

Related European Patent Application No. 08155769.6 Search Report; Aug. 15, 2008; Examiner: Hardeman, David.
IBM Corp: "Passages from Platform Plugin Developer Guide for Eclipse 3,1" [Online] Jun. 27, 2005, pp. 1-46, XP 002492345 Retrieved form the Internet: URL:http://archive.eclipse.org/eclipse/downloads/drops/R-3.1-200506271435/org. eclipse.platform.doc.isv.3.1.pdf.zip) [retrieved on Aug. 12, 2008] * p. 34-p. 46 * .

Related European Patent Application No. 08155769.6 Examination Report dated Aug. 27, 2009.
IBM Corp: "Passages form Platform Plugin Developer Guide for Eclipse 3,1" [Online] Jun. 27, 2005, pp. 851-864, XP 002492345 Retrieved form the Internet: URL:http://archive.eclipse.org/eclipse/downlaods/drops/R-3.1-200506271435/org. eclipse.platform.doc.isv.3.1.pdf.zip) [retrieved on Aug. 12, 2008].

* cited by examiner

SYSTEM AND METHOD FOR DEVICE SKINNING

RELATED APPLICATIONS

This patent application claims the benefit of U.S. Provisional Application No. 60/916,404, filed May 7, 2007.

COPYRIGHT NOTICE

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

FIELD

The present disclosure relates to apparatuses and methods for programming a computing device.

BACKGROUND

Programming languages are increasing in complexity and functionality. The broad range of available computing devices, including desktop computers, laptop computers, personal digital assistants, cellular telephones, wireless email paging devices continuously spurs the need for even more sophisticated programming languages in order to utilize the functionality of those computing environments.

An integrated development environment (IDE), also known as an integrated design environment and an integrated debugging environment, can be helpful for computer programmers who are developing software for different computing devices. IDEs can simplify the task of programmers so that they need not understand all of the peculiar details of every computing device for which they are tasked with programming. An example of a known IDE is JSEclipse from Adobe Systems Romania, formerly known as InterAKT Bdul. Vasile Milea, nr 2H, et 1, ZIP 061344, Bucharest, Romania, based on Eclipse from the Eclipse Foundation, Inc. 102 Centrepointe Drive, Ottawa, Ontario, Canada, K2G 6B1. Another example is Microsoft Visual Studio from Microsoft Corporation of 205 108th Ave. NE, Suite 400, Bellevue, Wash. 98004. There are challenges associated with these IDEs. Indeed, user interfaces allow users to interact with software applications. Different user interfaces display the same application differently based on the screen size and other attributes of the user interface. This presents a challenge when designing software applications, particularly for portable electronic devices.

Screen size and shape varies significantly between portable electronic devices. In addition, devices often use particular user interface themes that impact the appearance of software applications. Screen controls such as buttons and dropdown lists, for example, are painted in a different manner depending on the device. As a result, there are challenges in designing a software application using a single screen layout. In some cases, software application designers perform multiple design iterations before the software application appears as intended on a targeted device. It is therefore desirable to improve the design process for portable electronic device software applications.

DETAILED DESCRIPTION OF THE EXAMPLE EMBODIMENTS

In one aspect there is provided a plugin for a Rapid Application Development Tool including: a set of commands for defining an appearance of a UI design window in the Rapid Application Development Tool, the appearance of the application design window simulating a display screen of a portable electronic device and the set of commands being related to one type of portable electronic device.

In another aspect there is provided a method for building an application in a Rapid Application Development tool, the method including: selecting a skin corresponding to a portable electronic device type; launching a UI design window in the Rapid Application Development Tool, an appearance of the application design window simulating a portable electronic device having the portable electronic device type; and building the application in the Rapid Application Development Tool.

Figure 1:
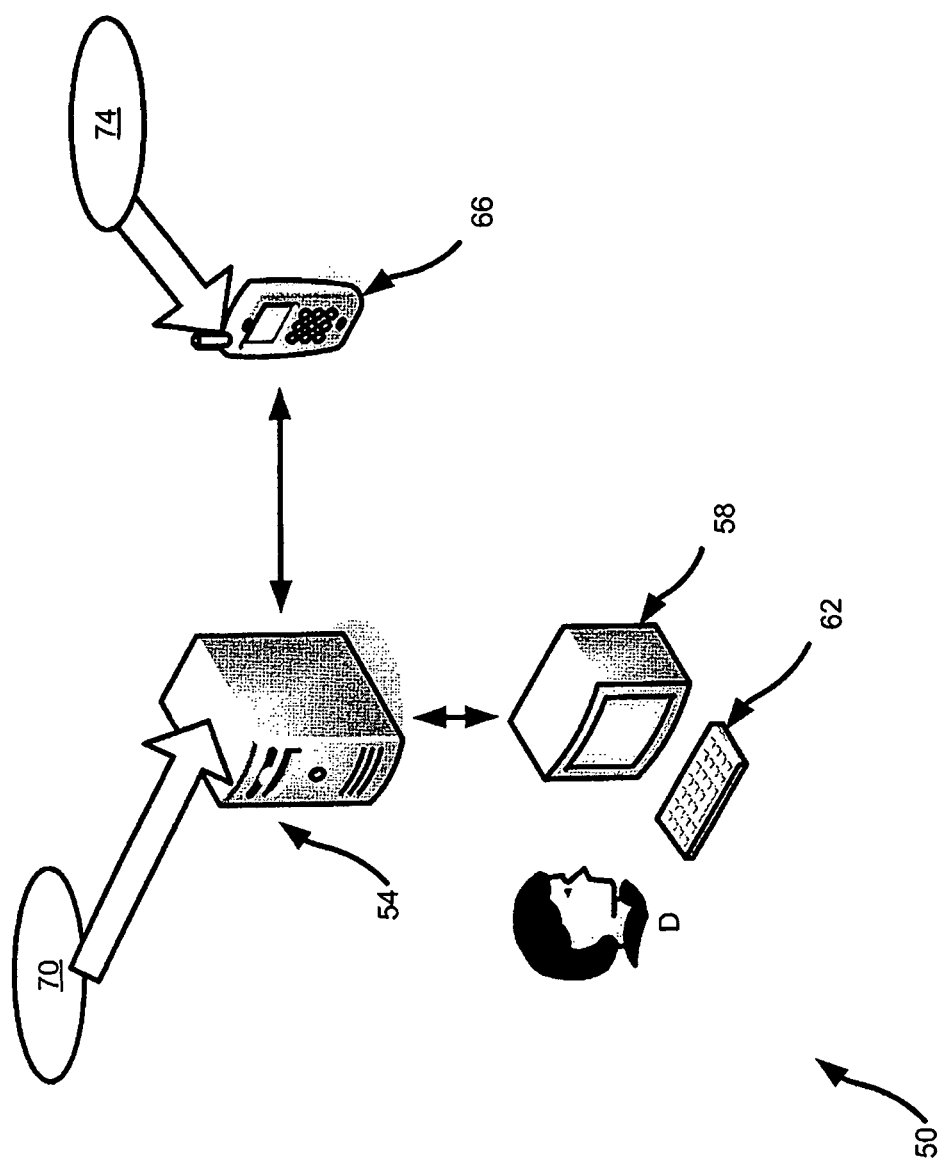
FIG. 1 shows a system for programming a computing device.

Referring now to FIG. 1, a system for programming a computing device is indicated generally at 50. System 50 includes a tower 54 coupled to a display 58, a keyboard 62 and a computing device 66. An IDE 70 executes on tower 54. A developer D using display 58 and keyboard 62 can interact with an IDE executing tower 54 in order to develop software 74 for execution on device 66, particularly for use when device 66 is disconnected from tower 54. As will become more apparent from the discussion further below, the term "develop" is used in a non-limiting sense, to refer to any exercise related to the creation and/or modification and/or the like of software 74.

Tower 54 houses at least one central processing unit, random access memory (or other volatile storage), read only memory and hard disc storage (or other non-volatile storage) all of which are interconnected by a bus. The computing environment of tower 54 renders tower 54 operable to execute IDE 70. IDE 70 executes on the central processing unit of tower 54, making appropriate and/or necessary use of other components within tower 54, and receiving instructions from developer D via keyboard 62 and generating responses for developer D on display 58.

Other types of input peripherals, in addition to or in lieu of keyboard 62 are contemplated. Likewise, other types of output peripherals, in addition to or in lieu of display 58 are contemplated.

Computing device 66 is a portable wireless email telephony device, but it should be understood that in other example embodiments computing device 66 can be any type of computing environment for which developer D may be called upon to develop software 74 using IDE 70. Software 74 can be any software object or software application or the like that executes on the computing environment device 66.

It should be understood that, overall, the environment of system 50, and the components therein, are examples and that other configurations are contemplated.

Figure 2:
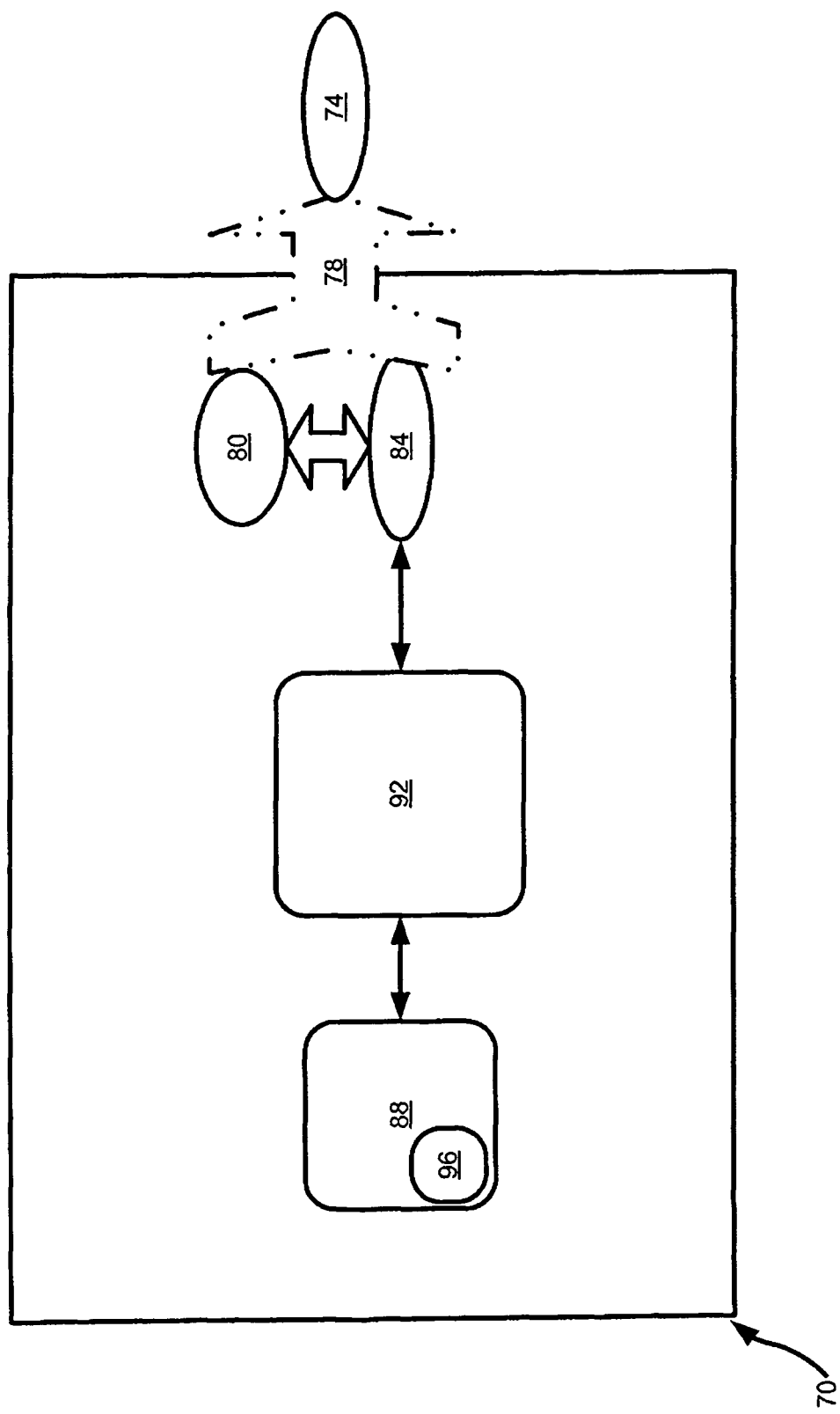
FIG. 2 is a graphic representation of the IDE from FIG. 1.

Referring now to FIG. 2, IDE 70 is shown in greater detail. IDE 70 includes a programming language 80 within which source code 84 can be developed. Programming language 80 can be based on any known or future-contemplated programming language, including, by way of non-limiting example, C++, Java, BASIC. Of note, however, is that programming language 80 is based on a programming language associated with device 66. Accordingly, programming language 80 is chosen to conform to the computing environment of device 66.

Source code 84, when based on a compiled language (e.g. C++), can be compiled to become software 74 for computing device 66. Source code 84, when based on an interpreted language (e.g. Java, JavaScript, VBScript) can be installed as software 74 on computing device 66, and then during runtime on device 66, software 74 will be interpreted according to a language interpreter on computing device 66. This step of compilation and/or installation is represented by the arrow indicated at 78 in FIG. 2.

IDE 70 also includes a development assistant engine 88, which is configured to operate in conjunction with an editor 92, in order to develop source code 84. Developer D can utilize keyboard 62 and display 58 in order to manipulate editor 92 to develop source code 84. Development assistant engine 88 is configured to provide a number of development assistant tools to developer D as developer D uses editor 92. Example tools include, but are not limited to code completion, automatic code correction, and context-sensitive help.

Engine 88 itself includes an engine definition file 96 which defines the tools that are implemented by engine 88. Engine definition file 96 corresponds with the syntax and programming rules associated with language 80, while the remainder of engine 88 is not tied in any manner to language 80.

Engine definition file 96 is fully editable, and, in a present example embodiment, engine definition file 96 is based on the eXtended Markup Language ("XML"), but engine definition file 96 can also be simply a plain text file or based on any other type of markup language or the like. Engine definition file 96 can be a database file with entries that can be manipulated. In the present example embodiment, file 96 is an XML file used for ease of readability and manipulation. Engine definition file 96 can be implemented as a plurality of discrete sub-files rather than a single file.

An example engine definition file 96 is provided in Table I.

TABLE I

Example Engine Definition File 96

\* Example Command\*
<Keyword>while</Keyword>
\* Example Context Sensitive Help \*
<CursorFocus="While" Comment= "Utilized for Do-While loop structure. Syntax is "While (Condition)". Correct syntax requires providing Condition which when true will cause looping, and when false will cause looping to cease." />

Engine definition file 96 working in conjunction with engine 88 implements the various development assistant tools. Those skilled in the art will recognize that Table I includes an example of at least a portion of an engine definition file 96 that includes content for a context-sensitive help tool wherein a text-bubble is provided adjacent to the text being entered by developer D. As per the example in Table I, assume that language 80 includes the command "While", then engine 88 and definition file 96 can cooperate so that if the cursor in editor 92 is focused on the command "While", then engine 88 would display in editor 92 a text-bubble that displays the comment "Utilized for Do-While loop structure. Syntax is 'While (Condition)'. Correct syntax requires providing Condition which when true will cause looping, and when false will cause looping to cease". The raw-data relationship that associates "While" with the previously-described example comment is maintained within definition file 96, while the logic to present this comment as a text bubble in association with "While" is embedded within engine 88. Engine 88 is configured to read file 96 to obtain the comment and its associated command, "While", and implement logic within engine 88 to present the comment in association with the term "While" within editor 92. Thus, the aspects of the contents of comment that are specific to commands with language 80 are maintained within a separately editable engine definition file 96, without impacting engine 88.

Those skilled in the art will recognize that the code completion tool could include predictive text capabilities. For example, using the example engine definition file 96 in Table I, it is assumed that language 80 includes the command "While". Thus, if developer D enters the text "Wh" into editor 92, then engine 88, working in conjunction with definition file 96 could predict that developer D was entering the command "While" and complete typing the remainder of the command so that developer D need not type the remaining letters of "ile" via keyboard 62. Engine 88 can examine file 96 and determine the presence of the "While" command and define a relationship that associates "Wh" with "While",—thus the logic to complete "Wh" into "While" would be embedded within engine 88. Engine 88 is configured to read file 96 to obtain the keyword "While" and implement logic within engine 88 to actually perform code completion within editor 92. Thus, the command "While", which is specific to language 80 is maintained within a separately editable engine definition file 96, without impacting the tool functionality in engine 88.

Those skilled in the art will recognize that an automatic code correction tool could include similar functionality to automatic spelling correction found in word processors. For example, again using the example engine definition file 96 in Table I, it is assumed that language 80 includes the command "While", then if developer D enters the text "Whlie" into editor 92, then engine 88 would assume that developer D intended to enter the command "While" and would automatically change "Whlie" into "While". Again, the definition of language 80 can thus be maintained in file 96, without impacting engine 88.

All of the tools can also work in conjunction with each other. Another example tool is a method and tips tool that provides information about a current method that is being worked on. Further tools that can be included within engine 88 will now occur to those skilled in the art.

Figure 3:
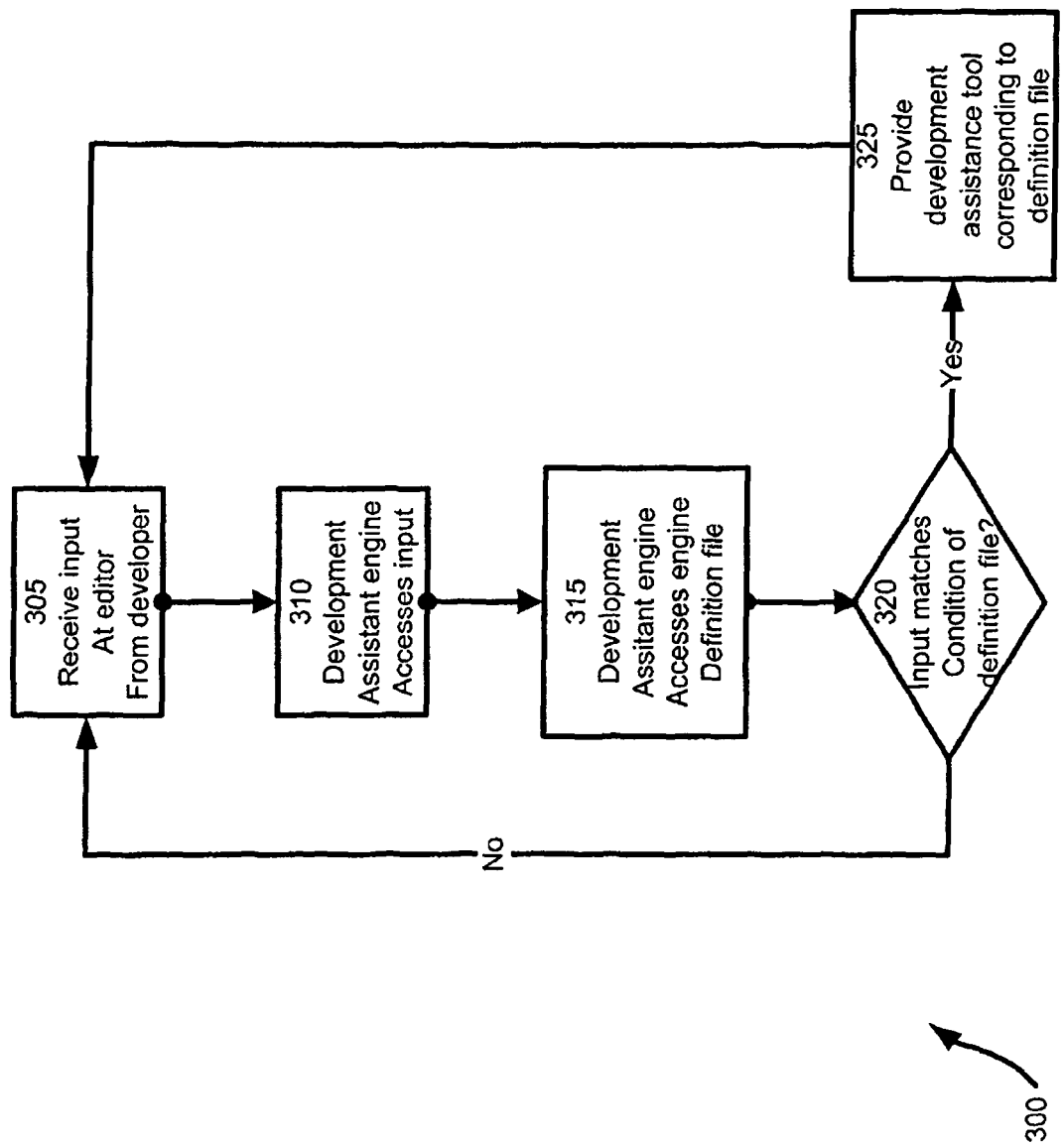
FIG. 3 is a flowchart depicting a method for programming a computing device, to an example embodiment.

Referring now to FIG. 3, a method of programming a computing device is depicted in the form of a flowchart and indicated generally at 300. Method 300 can be used in conjunction with system 50, however, it should be understood that method 300 can be used with other systems, other than system 50, and that both method 300 and system 50 can be varied in accordance with the teachings herein. For example, the sequence of steps of method 300 can be changed, and/or certain steps may be performed substantially in parallel. Also, the particular manner in which any given step is implemented is not particularly limited.

To assist in further understanding system 50 and the understanding of method 300, method 300 will be explained in relation to its performance on system 50. Beginning at step 305, input is received at an editor. The input at step 305 is typically programming instructions that are received by editor 92, as those instructions are entered via keyboard 62, and simultaneously displayed on display 58 in accordance with the functionality of editor 92.

Next, at step 310, the development assistant engine accesses the input received at step 305. In system 50, the input that was received by editor 92 is now accessed by development assistant engine 88.

At step 315, the development engine accesses the engine definition file. In system 50, development assistant engine 88 will read the contents of engine definition file 96. In a present example embodiment, development assistant engine 88 can load definition file 96 into random access memory for speed of execution and traversal of file 96.

At step 320, a determination is made as to whether any input received at step 305 matches any of the conditions of the engine definition file. Step 320 in a present example embodiment is performed by development assistant engine 88, which makes a comparison between any conditions that have been defined in engine definition file 96 with the input that was accessed by development assistant engine 88 at step 310. If a match is not found, then method 300 returns from step 320 back to step 305. However, if a match is found, then method 300 advances from step 320 to step 325, at which point a development assistant tool corresponding to the condition matched at step 320 is provided via editor 92 on display 58 to developer D.

Those skilled in the art will now recognize that the performance of step 325 can correspond with the above-described examples given in relation to the example engine definition file 96 Table I. For example, assuming that the input received at step 305 was "Wh", then the code completion tool can be provided at step 325 to automatically type the complete command "While" within editor 92 and thereby obviate the need for developer D to finish typing the "ile".

Note that, at this point, method 300 can cycle back from step 325 to step 305, and now detect the input "While" at step 305, such that during this cycle through method 300, at step 325 the context sensitive help tool can be provided at step 325 and thereby provide a text-bubble which displays the comment "Utilized for Do-While loop structure. Syntax is "While (Condition)". Correct syntax requires providing Condition which when true will cause looping, and when false will cause looping to cease."

Figure 4:
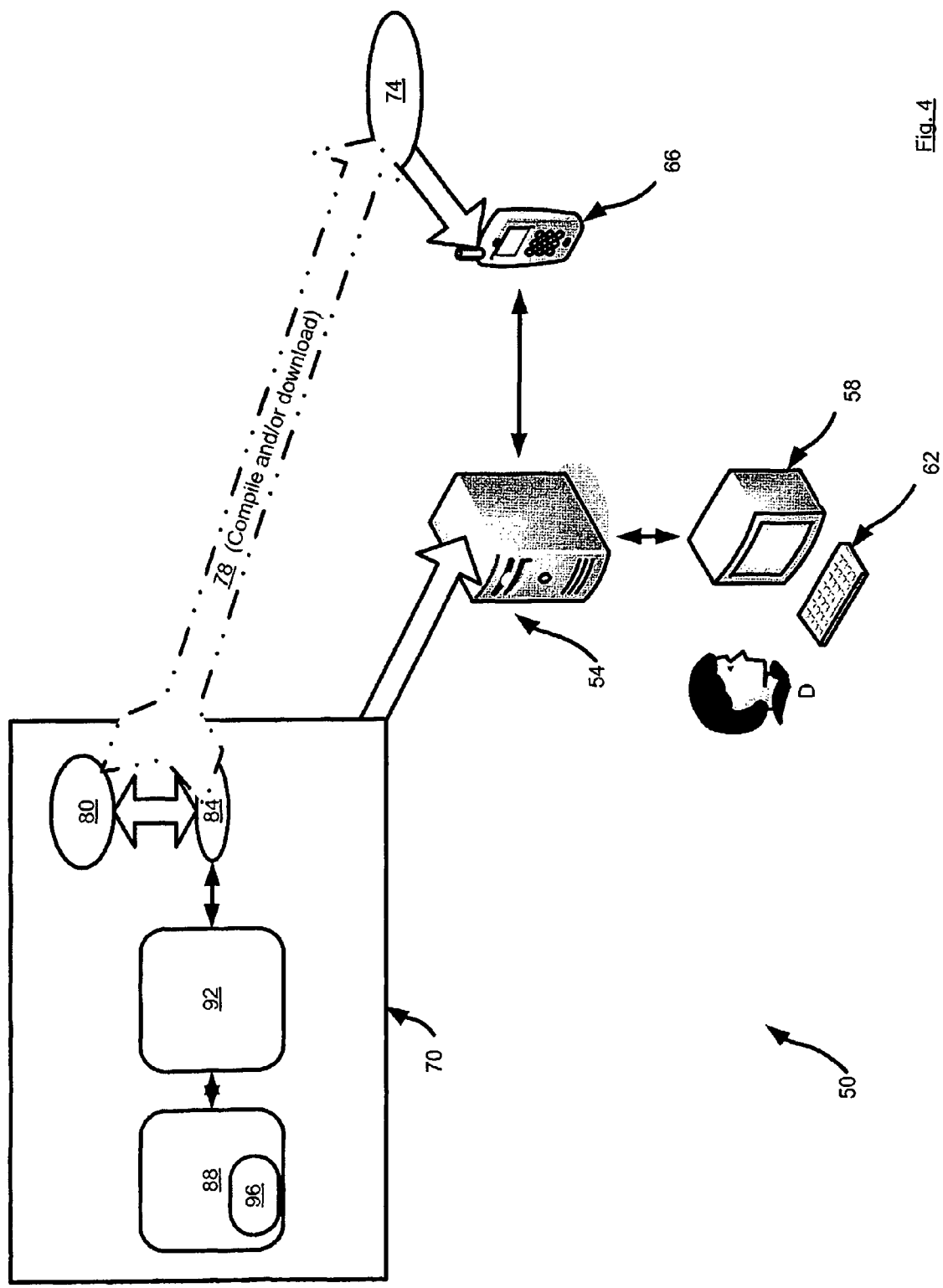
FIG. 4 is a consolidation of FIGS. 1 and 2.
Figure 5:
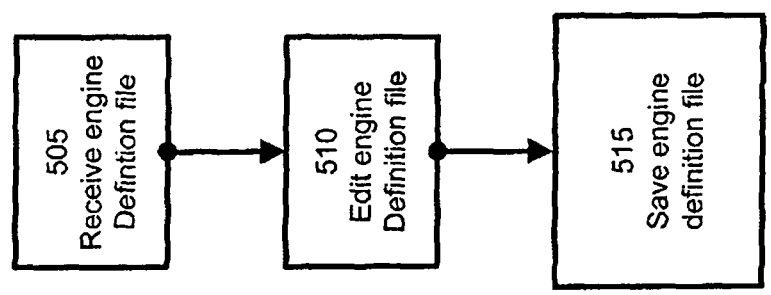
FIG. 5 is a flowchart depicting a method of updating an IDE, according to an example embodiment.

Another example embodiment represents a method for modifying an IDE to correspond with a different or new computing device. This example embodiment will now be explained with reference to FIGS. 4-6. FIG. 4 combines FIGS. 1 and 2 to show system 50 all within a single Figure. Of note in FIG. 4, language 80 corresponds to a computer programming language native to computing device 66, and likewise engine definition file 96 corresponds to language 80. However, editor 92, engine 88 independent from language 80 and/or device 66. FIG. 5

FIG. 5 shows a flowchart depicting a method for modifying an IDE to correspond with a different or new computing device that has a new language associated therewith.

Figure 6:
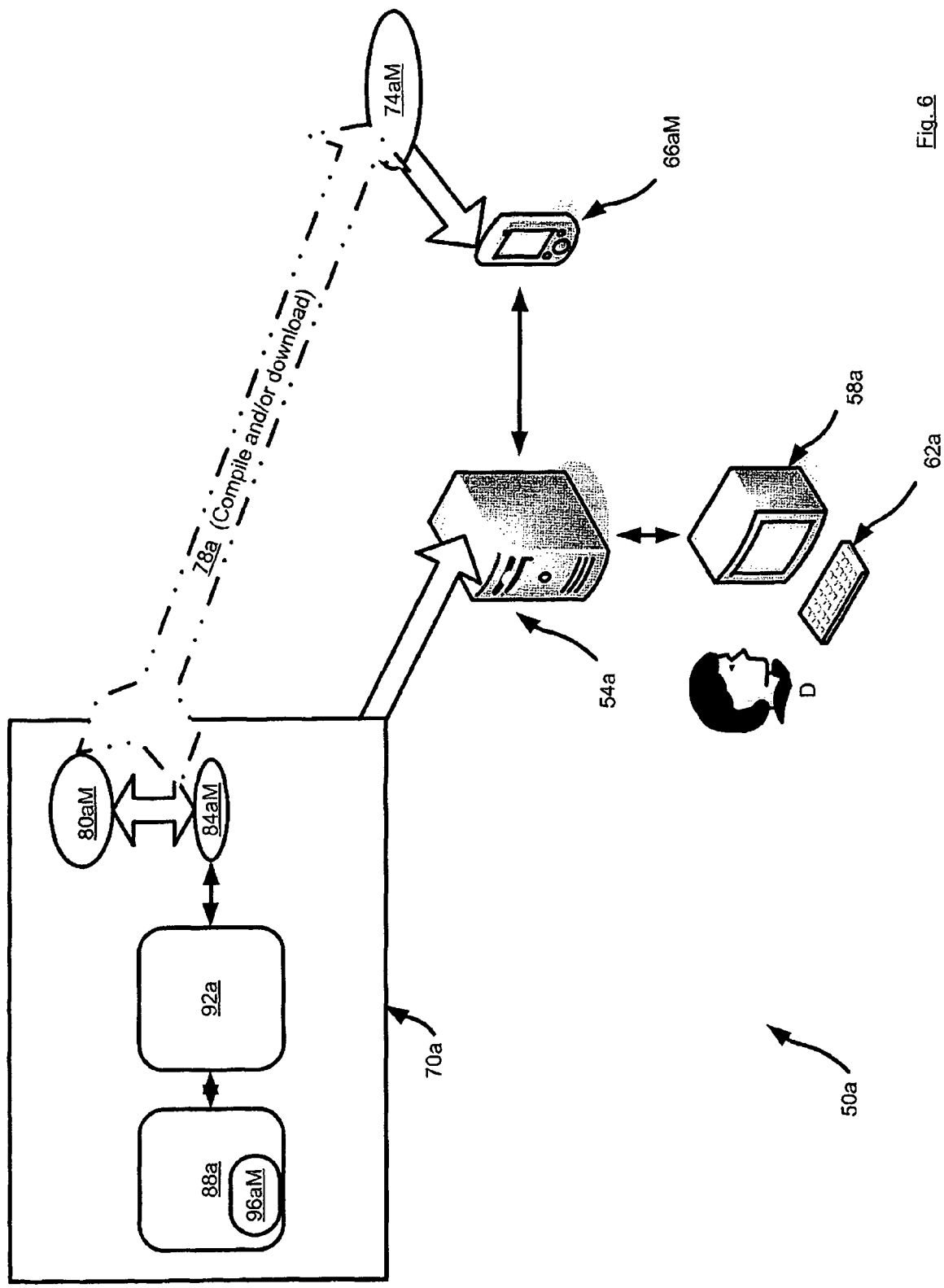
FIG. 6 shows a modification of the system of FIG. 4, modified using the method in FIG. 5.

FIG. 6 shows system 50a, which is substantially the same as system 50 and identical elements have identical references, except followed by a suffix a. However, elements in system 50a that are modified from their corresponding elements in system 50 also include the suffix M. Thus, in FIG. 6, device 66aM is a different device than device 66. Likewise, language 80aM corresponds to device 66aM, and is also different from language 80a. Likewise, language definition file 96aM corresponds with language 80aM, and is different than definition file 96.

Referring again to FIG. 5, FIG. 5 shows a method whereby language definition file 96 can be modified so that IDE 70 can be used to develop software for a modified computing device 66aM instead of the original computing device 66. At step 505, an existing engine definition file is received. Thus, in the example shown in FIG. 4, language definition file 96 is loaded into an editor. Editor 92 can be used to edit file 96 (though relying solely on the editing features of editor 92 and without reliance on the features of engine 88), however this is a non-limiting example and any editor can also be used due to the structure of file 96. At step 510, language definition file 96 is edited. File 96 is edited to conform to language 80aM in order to create language definition file 96aM. At step 515, language definition file 96aM is saved within engine 88a, as depicted in FIG. 6.

An example engine definition file 96aM is provided in Table II

TABLE II

Example modified Engine Definition File 96aM

\* Example Command\*
<Keyword>while</Keyword>
<Keyword>until</Keyword>
\* Example Context Sensitive Help \*
<CursorFocus="While" Comment= "Utilized for Do-While loop structure. Syntax is "While (Condition)". Correct syntax requires providing Condition which when true will cause looping, and when false will cause looping to cease." />
<CursorFocus="Until" Comment= "Utilized for Do-Until loop structure. Syntax is 'Until (Condition)'. Correct syntax requires providing Condition which when true will cause looping, and when false will cause looping to cease." />

A comparison of Table II and Table I shows that Table II is substantially the same as Table I, except that new text identifying a new keyword has been added, namely, the keyword "until". Additional context sensitive help has been added, namely, that if the text "Until" is detected then the following comment will be displayed: "Utilized for Do-Until loop structure. Syntax is "'Until (Condition)"'. Correct syntax requires providing Condition which when true will cause looping, and when false will cause looping to cease.

Thus, once method 500 has been performed, developer D can immediately begin developing software for device 66aM, based on developer D's existing understanding of device 66, and without having to take any particular steps to learn about the functionality of device 66aM.

Thus, as manufacturers of devices such as 66 enhance, change or create new devices, those same manufacturers can simply provide a copy of language 80 that corresponds to the device, and likewise provide a copy of engine definition file 96 in text format, without having to provide a completely new IDE as well. Language 80 and engine definition file 96 are modular, and can be changed, without disrupting or requiring changes to, or recompilation of the IDE itself, or any of the other components therein. The foregoing can be useful when device 66 already relies on the essential substance of a well-known programming language that is already known to developer D, but includes various extensions to that programming language that are unique to the functionality of device 66 and yet which are unknown to developer D. Likewise, developer D can continue to use the same IDE environment with which the developer D is already familiar for any new devices 66 with which that developer D is not already familiar.

It should also be understood that method 500 can be modified to simply create a new definition file for any new programming languages that may be developed.

The foregoing provides certain example embodiments, but it should be understood that variations, subsets, and combinations of those example embodiments are contemplated. For example, it should be understood that the Engine Definition Files in Table I and Table II are greatly simplified in order to assist in explaining the teachings herein. Appendix I attached hereto shows a more detailed, yet still example, engine definition file 96 in the form of two files, MDScript.xml and Library.xml, which collectively can include engine definition file 96. Appendix II, attached hereto, shows a detailed example of text that can be added to engine definition file 96, such that collectively Appendix I and Appendix ii can represent engine definition file 96aM.

Figure 7:
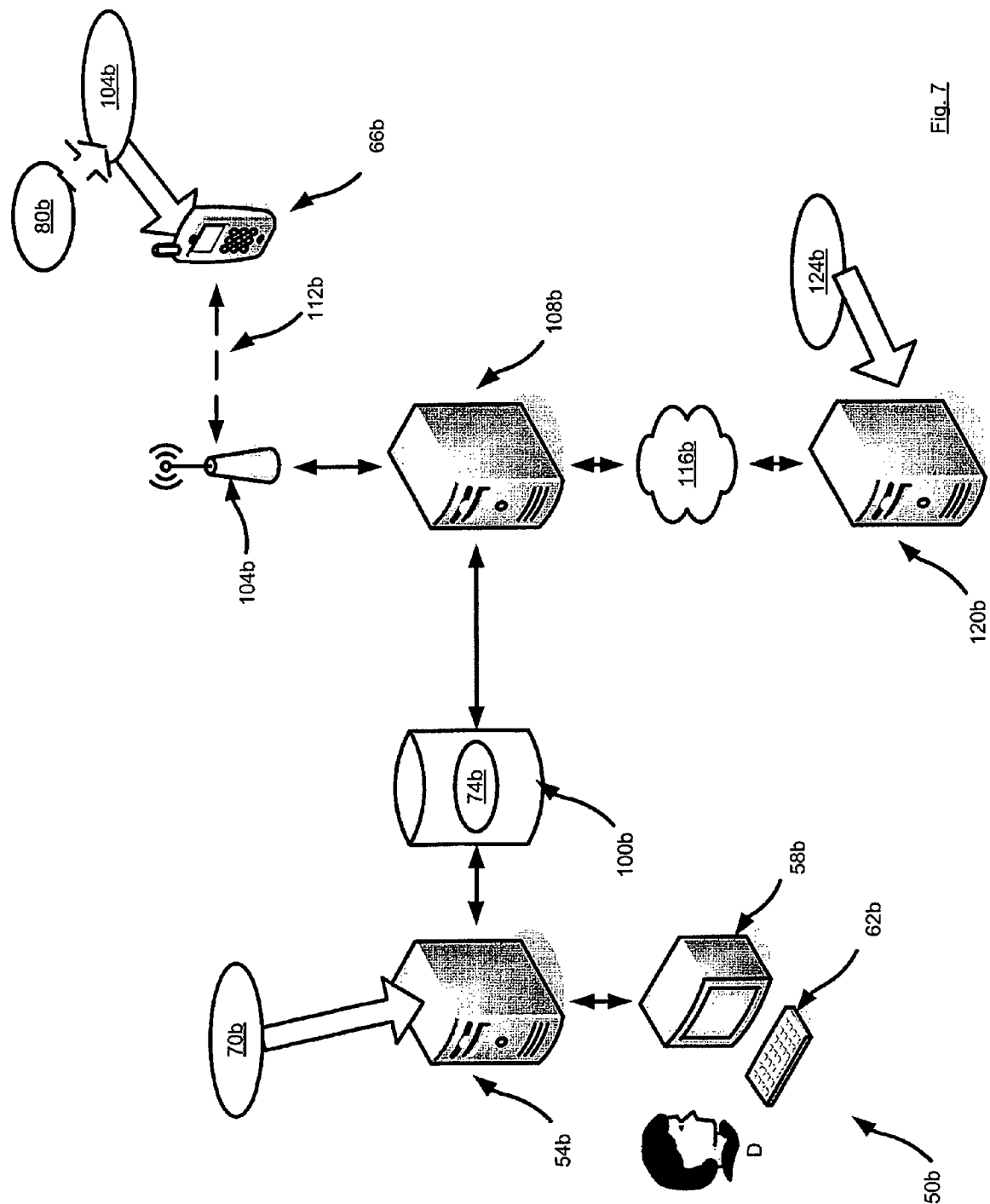
FIG. 7 shows a system for programming a computing device in accordance with another example embodiment.

The teachings herein can also be incorporated with one or more of the teachings of WO-2004-59938, WO-2004-59957, WO-2004-59939, and U.S. application Ser. No. 11/078,331, the contents of each of which are incorporated herein by reference. Indeed, FIG. 7 shows system 50b, which is substantially the same as system 50 and identical elements have identical references, except followed by a suffix b. However, certain new elements appear in system 50b and those elements reflect aspects of how system 50 can be modified to operate with the teachings of WO-2004-59938, WO-2004-59957, WO-2004-59939 and U.S. application Ser. No. 11/078,331.

More specifically, system 50b also includes a data repository 100b onto which software 74b can be stored for eventual execution on device 66b using a runtime environment 104b on device 66b. Indeed, system 50b is configured for software 74b where software 74b is based on an interpreted language 80b, such as JavaScript or the like. Thus, runtime environment 104b is an application on device 66b that corresponds to language 80b—which is of course the same language 80b that is used by IDE 70b used to create software 74b. Runtime environment 104b also, of course, corresponds to programming language 80b.

System 50b thus also includes an application gateway 108b that is connected to repository 100b. In turn, application gateway 108b is connected to a wireless base station 104b, which permits device 66b to communicate with application gateway 108b via wireless link 112b. (Other infrastructures, however, that permit device 66b to communicate with application gateway 108b are contemplated). Application gateway 108b is also connected to a wide area network, which in the present example embodiment is the Internet 116b. Internet 116b, in turn, is connected to an application server 120b. Application server 120b can host any type of service 124b, such as a web-page, am application, or any other type of service that a user of device 66b may wish to access using software 74b via Internet 116b.

Figure 8:
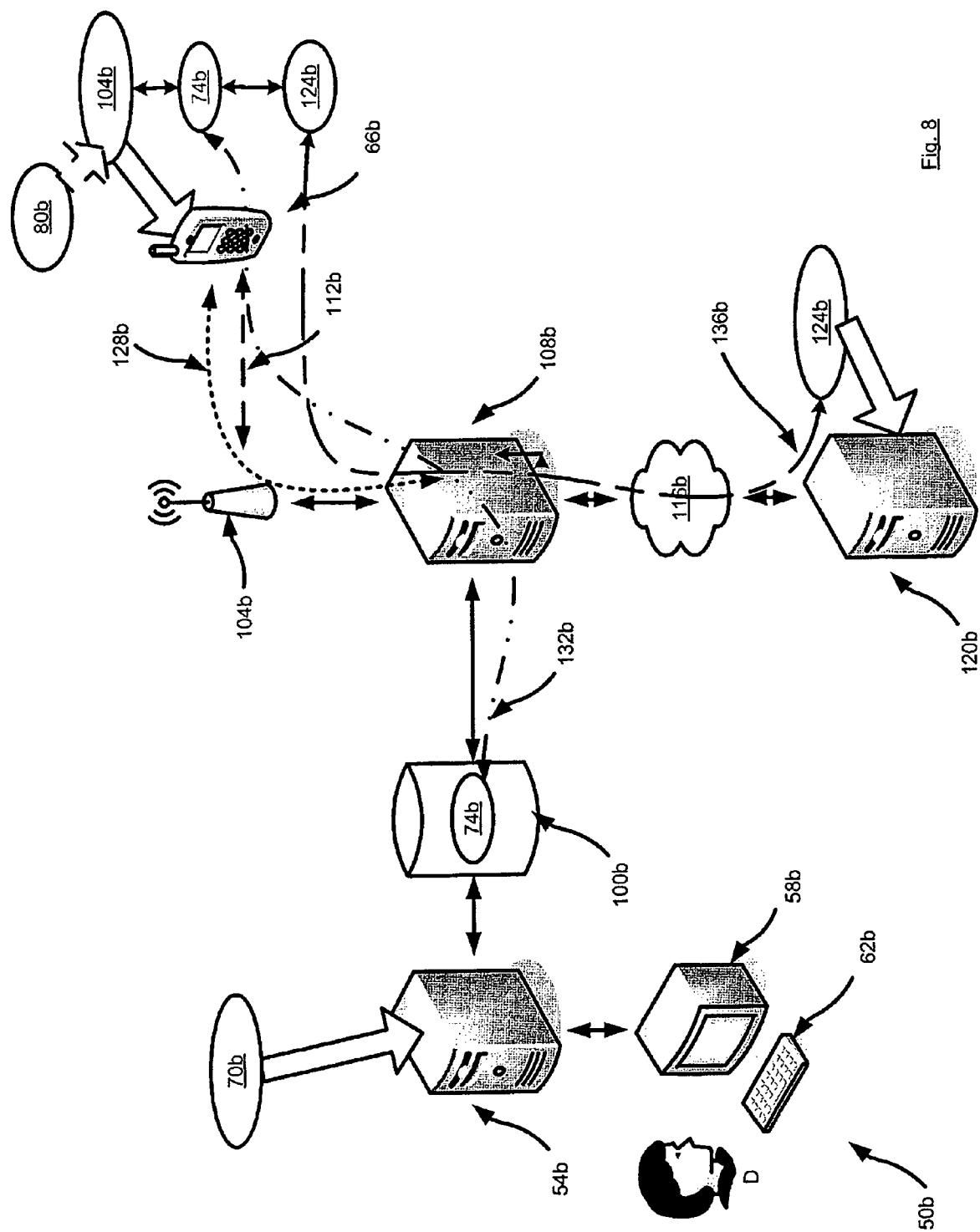
FIG. 8 shows an example performance of the system of FIG. 7.

Example operation of system 50b is shown in FIG. 8, wherein a request from device 66 to application server 120b is represented as a dotted line which is indicated at reference 128b. Request 128b includes a request for service 124b. Application server 120b is configured to correlate information about device 66b, including the fact that language 80b is specific to device 66b, and to provide a response to request 128b by providing software 74b to runtime environment 104b within device 66, such response being represented as a dotted line which is indicated at reference 132b. While response 132b can result in the entirety of software 74b being "downloaded" to device 66b, it should be understood that it is contemplated that scripts (i.e. portions) of software 74b are provided to device 66b as needed and that runtime environment 104b executes those scripts, and thus response 132b can in fact represent a plurality of responses. Once relevant scripts of software 74b are executing in device 66b, then application gateway 108b also provides a second response by providing service 124b to software 74b as software 74b is executing within device 66b and calling upon service 124b. The second response (which in fact may be a plurality of responses) is represented as a dotted line which is indicated at reference 136b.

It is to be reiterated that software 74b and service 124b can be virtually unlimited in scope and thus that system 50b represents a generic architecture. A specific example can assist, however, in understanding the full potential scope of system 50b. Service 124b can include mapping information, while software 74b can be mapping software. Thus, should a user of device 66b wish to view the mapping information associated with service 124b, then the mapping software 74b needed to view the maps can be executed in runtime environment 104b and then service 124b can be accessed. One advantage of this example embodiment is that developer D can create different mapping software respective to different devices, and yet each of those devices can access the same service 124b, without modifying service 124b and/or having to cause 124b to be specifically tailored to each device that accesses it. Thus, as new devices are deployed, developer D can simply make software to those devices available in repository 100b, and no modifications to service 124b are required.

Figure 9:
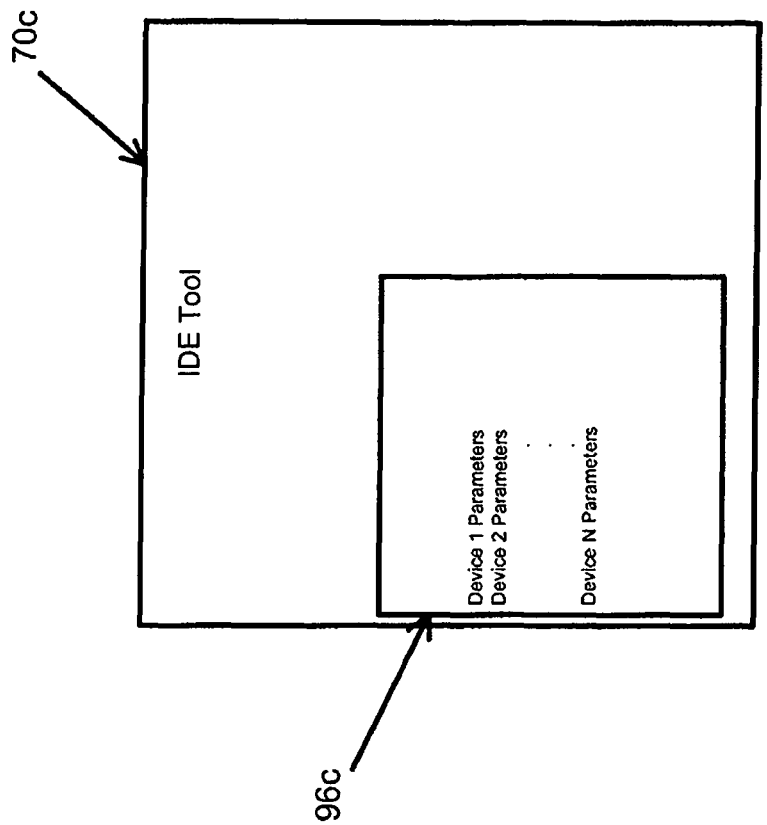
FIG. 9 is a schematic view of an IDE including a plugin according to an example embodiment.

Referring now to FIG. 9, an IDE in accordance with another example embodiment is indicated generally at 70c. IDE 70c can be incorporated into the same basic framework of system 50 as described above, but subject to the modifications discussed below. Like components in the following description bear like-references to substantially corresponding in relation to system 50 and system 50a as described above. However, certain modifications are effected to IDE 70c. Of note is that engine definition file 96 is not included in IDE 70c, and instead a plugin program 96c is used with IDE 70c. The relationship between a plugin program 96c according to another example embodiment and a IDE 70c is generally shown in FIG. 9. Like engine definition file 96, plugin program 96c is, in a present example embodiment, an XML (Extensible MarkUp Language) file that is used in conjunction with the IDE 70c to allow for the selection of portable electronic device-specific skins in the IDE 70c. The application design window of IDE 70c, which in the present example embodiment, is used for user interface (UI) design, is rendered based on the XML file. It should now be understood that plugin program 96c is analogous to engine definition file 96, and that plugin program 96c can be based on other editable file structures, other than XML, in the same manner that engine definition file 96 can also be based on other editable file structures.

Of note, while engine definition file 96 is operated in conjunction with engine 88 to provide code development tools, plugin program 96c provides device-specific skins within the IDE 70c.

An example of an XML file suitable for plugin 96c is provided in Appendix III. The XML file is configurable to include skins for any number of portable electronic devices. The XML file defines screen size, default colors, button styles and other device-specific attributes.

Figure 10:
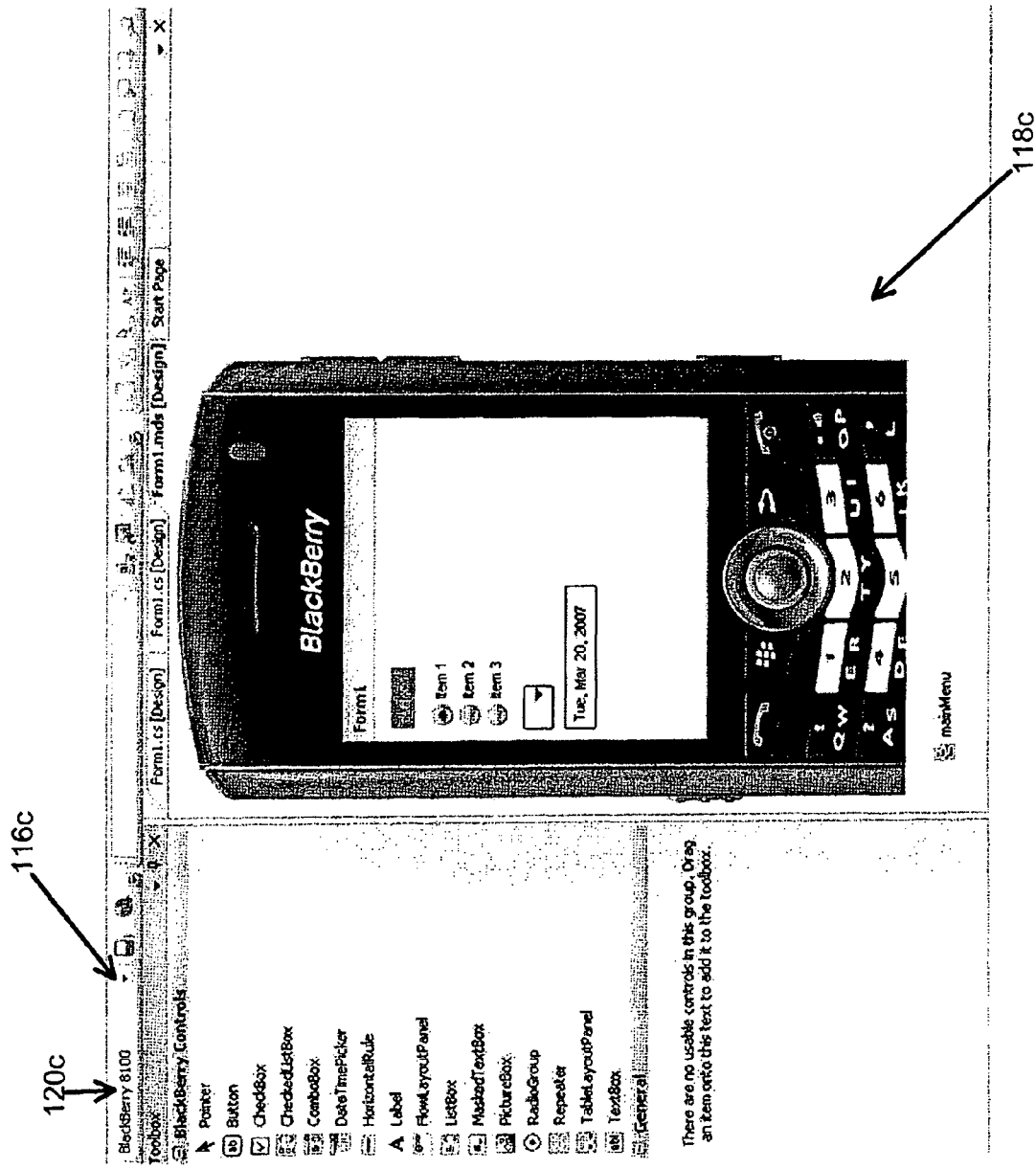
FIGS. 10 to 12 are screen shots of portions of a IDE environment.

Referring to FIG. 10, a drop down list 116c in IDE 70c includes multiple different portable electronic device types. The content of the list is determined by the plugin, which provides rendering instructions to IDE 70c to allow a user-interface design window 118c to simulate the portable electronic device 120c that is selected from the list 116c. In the example of FIG. 10, the selected portable electronic device is a Blackberry 8100™. As shown, a skin resembling this device appears in the design window 118c.

It will be appreciated by a person skilled in the art that selection of the portable electronic device type is not limited to the drop down list. For example, buttons having thumbnail images of the different devices may alternatively be provided.

Plugin 96c includes multiple sets of commands that control the appearance of the design window 118c for multiple portable electronic device types. Each set of commands controls appearance attributes for a particular device type. Device type attributes can include, but are not limited to: screen size, button location, button appearance, menu location, menu appearance, borders and background images, for example. By providing a simulation of a portable electronic device type in the design window 118c, a developer can design an application while taking into account the appearance attributes of a specific type of portable electronic device. Therefore, when the application has been completed, the appearance of the application in the IDE will match the appearance of the application when viewed on the actual device.

Figure 11:
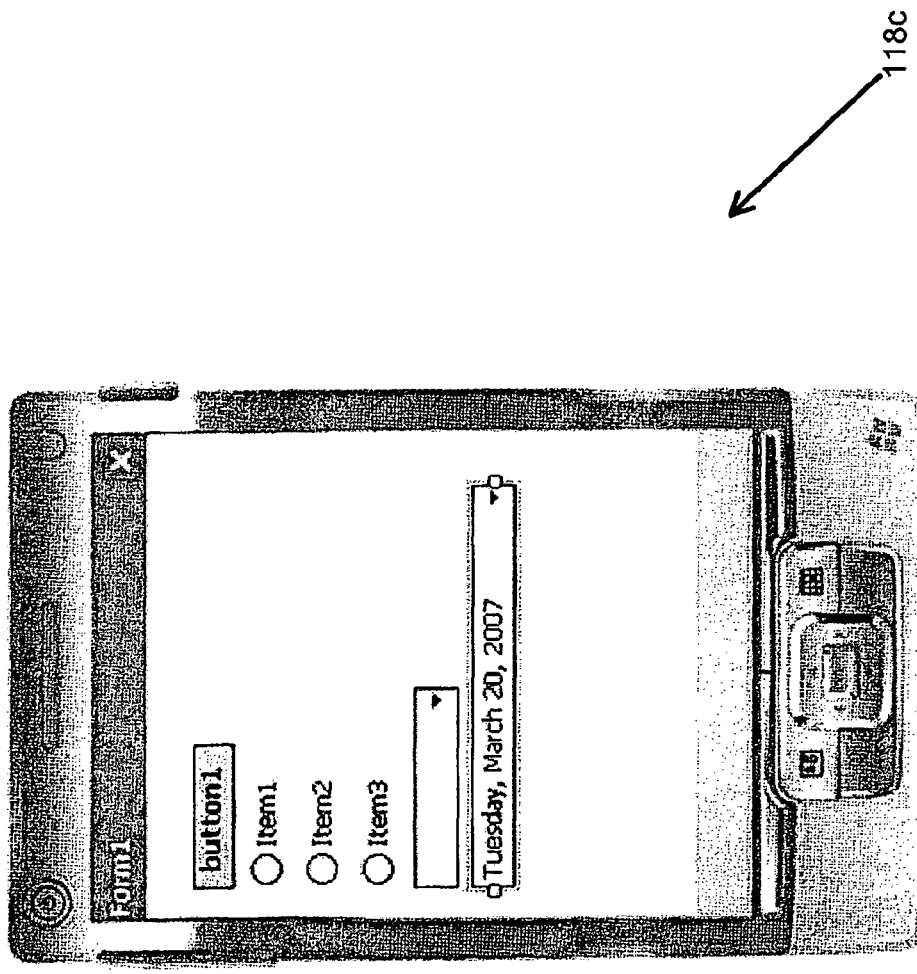

Referring to FIG. 11, a different portable electronic device is simulated in the application design window 118c of IDE 70c. In this example, the skin simulates a Pocket PC device. It will be appreciated that any number of different types of portable electronic devices may be included in the plugin program. Some examples include: Blackberry™ devices, PocketPC™ devices, Palm™ devices and Nokia™ devices.

Figure 12:
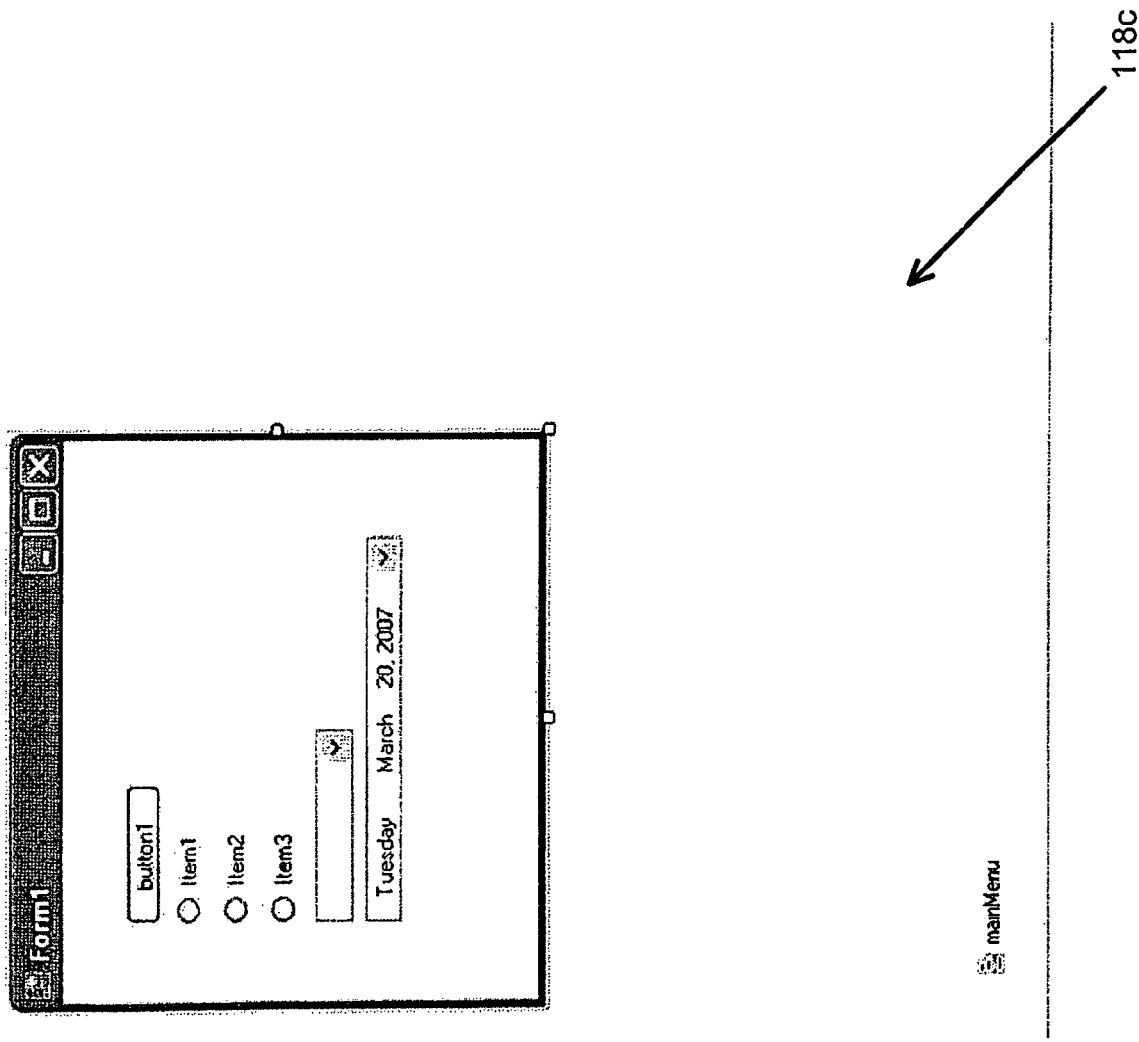

FIG. 12 shows an application design window 118c as it would appear without a portable electronic device skin selected. As shown, the screen layout is quite different than the layout shown in FIGS. 10 and 11. Without the device-specific simulated environment, the developer of the application cannot see how the application will appear on the portable electronic device until the application is actually downloaded to the device.

By showing the developer how their developed application will look on a targeted portable electronic device, the developer can make the appropriate adjustments to the developed user interface to best take advantage of the targeted platform's user-interface attributes. In addition, this can reduce the likelihood of re-design being required following device-specific testing.

Figure 13:
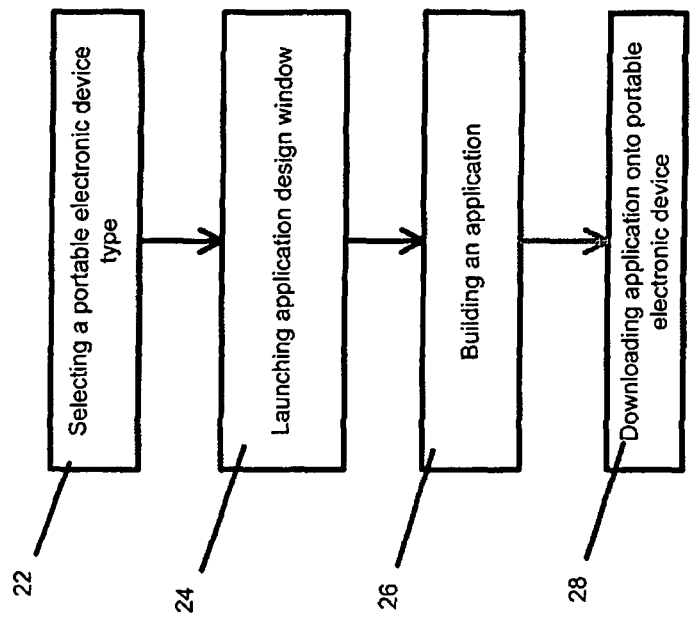
FIG. 13 is a flowchart depicting a method for building an application using the plugin of FIG. 9, according to an example embodiment.

Referring to FIG. 13, a method for building an application in an IDE is represented in the form of a flow-chart indicated generally at 1100. At step 1122, the user selects a portable electronic device type from a list of supported portable electronic devices. At step 1124, a user-interface design window 118b is launched in the IDE 70c. The design window 118c includes a skin of the selected device so that the appearance of the application design window 118c corresponds to the selected device type. At step 1126, the user builds an application in the design window 118c. Techniques for building applications are well known in the art and therefore will not be described further here. At step 1128, the user downloads the completed application onto the portable electronic device. Once downloaded, the user is able to view the application on the portable electronic device. The appearance of the application on the portable electronic device is generally identical to the appearance of the application on the simulated portable electronic device in the design window 118c of IDE 70c.

In another example embodiment, the XML file includes a main attribute at the top called "fledgeLocation". This is the location of the default simulator that is launched for all of the skins provided in the XML file when the developed application is debugged in the IDE. "isRelativePath" in the XML file specifies if the path to the default simulator is relative to the IDE running directory. Alternatively, rather than having a single default simulator for all skins in the XML file, each skin may be provided with its own default simulator. In addition, command line parameters on each skin element may be specified for the simulator to be launched. These parameters are specific to the simulator being launched.

In another example embodiment, the plugin program is replaced by code that is integrated into the IDE. Device-specific application design windows are therefore provided in the main IDE and no plugin is required.

In still another example embodiment, the XML file is replaced with a comma delimited file, an ini (initialization) file, a database file or windows registry.

Various specific example embodiments have been shown and described herein. However, modifications and variations may occur to those skilled in the art. All such modifications and variations are believed to be within the sphere and scope of the present specification.

It is to be understood that combinations, variations, and/or subsets of the various example embodiments described herein are contemplated.

The invention claimed is:

1. An apparatus for programming a computing device comprising:
    at least one central processing unit, a volatile storage unit and non-volatile storage unit interconnected by a bus;
    an input peripheral for receiving input from a user and connected to the at least one central processing unit;
    an output peripheral for generating output for presentation to the user and connected to the at least one central processing unit; and
    the at least one central processing unit is configured to:
        execute a plurality of programming instructions implementing an integrated development environment, and
        execute a set of commands in conjunction with the integrated development environment for defining an appearance of a user-interface design window on the output peripheral, the appearance of the user-interface design window simulating a display screen of a portable electronic device and the set of commands being related to one type of portable electronic device.

2. The apparatus of claim 1 wherein the set of commands includes multiple sets of commands, each of the sets of commands being related to a different type of portable electronic device.

3. The apparatus of claim 1 wherein the set of commands controls parameters selected from the group consisting of: screen size, button location and button appearance.

4. The apparatus of claim 1 wherein the set of commands specifies a default simulator for a skin defined by the set of commands.

5. The apparatus of claim 1 wherein the set of commands is implemented as an editable file that is separate from the integrated development environment.

6. The apparatus of claim 1 wherein the set of commands is based on the Extensible Markup Language ("XML").

7. A method comprising:
    executing a plurality of programming instructions implementing an integrated development environment; and
    executing a set of commands in conjunction with the integrated development environment for defining an appearance of a user-interface design window on an output peripheral for presentation to a user, the appearance of the user-interface design window simulating a display screen of a portable electronic device and the set of commands being related to one type of portable electronic device.

8. The method of claim 7 wherein the set of commands includes multiple sets of commands, each of the sets of commands being related to a different type of portable electronic device.

9. The method of claim 7 wherein the set of commands controls parameters selected from the group consisting of: screen size, button location and button appearance.

10. The method of claim 7 wherein the set of commands specifies a default simulator for a skin defined by the set of commands.

11. The method of claim 7 wherein the set of commands is implemented as an editable file that is separate from the integrated development environment.

12. The method of claim 7 wherein the set of commands is based on the Extensible Markup Language ("XML").

13. A non-transitory computer-readable medium comprising:
programming instructions that, when executed, implement an integrated development environment; and
a set of commands in conjunction with the integrated development environment, the set of commands, when executed, define an appearance of a user-interface design window on an output peripheral for presentation to a user, the appearance of the user-interface design window simulating a display screen of a portable electronic device and the set of commands being related to one type of portable electronic device.

14. The non-transitory computer-readable medium of claim 13 wherein the set of commands includes multiple sets of commands, each of the sets of commands being related to a different type of portable electronic device.

15. The non-transitory computer-readable medium of claim 13 wherein the set of commands controls parameters selected from the group consisting of: screen size, button location and button appearance.

16. The non-transitory computer-readable medium of claim 13 wherein the set of commands specifies a default simulator for a skin defined by the set of commands.

17. The non-transitory computer-readable medium of claim 13 wherein the set of commands is implemented as an editable file that is separate from the integrated development environment.

18. The non-transitory computer-readable medium of claim 13 wherein the set of commands is based on the Extensible Markup Language ("XML").

* * * * *